United States Patent [19]
Umemoto

[11] Patent Number: 5,403,246
[45] Date of Patent: Apr. 4, 1995

[54] CONTROL DEVICE FOR AN INTERNAL COMBUSTION ENGINE

[75] Inventor: Hideki Umemoto, Himeji, Japan

[73] Assignee: Mitsubishi Denki Kabushiki Kaisha, Tokyo, Japan

[21] Appl. No.: 166,797

[22] Filed: Dec. 1, 1993

Related U.S. Application Data

[63] Continuation of Ser. No. 870,347, Apr. 17, 1992, abandoned.

[30] Foreign Application Priority Data

| May 2, 1991 | [JP] | Japan | 3-100254 |
| May 2, 1991 | [JP] | Japan | 3-100255 |
| May 2, 1991 | [JP] | Japan | 3-100256 |

[51] Int. Cl.⁶ ............ F02D 41/16; B60K 41/04; F16H 59/68
[52] U.S. Cl. ............ 477/101; 477/109; 477/83
[58] Field of Search ........ 74/851, 858; 440/1, 440/75; 192/0.062, 0.084; 123/445; 477/101, 102, 109, 83, 89

[56] References Cited

U.S. PATENT DOCUMENTS

| 2,673,474 | 3/1954 | Boyce | 74/851 |
| 3,734,069 | 5/1973 | Akiyama et al. | 123/32 SP |
| 3,792,630 | 2/1974 | Hause | 74/851 X |
| 4,262,622 | 4/1981 | Dretzka et al. | 440/1 |
| 4,432,734 | 2/1984 | Bland et al. | 440/1 |
| 4,488,455 | 12/1984 | Shetler et al. | 477/101 X |
| 4,525,149 | 6/1985 | Broughton et al. | 440/1 |
| 4,528,954 | 7/1985 | Slattery | 123/413 |
| 4,602,602 | 7/1986 | Donohue | 74/860 X |
| 4,658,792 | 4/1987 | Iamashita et al. | 123/445 X |
| 4,662,491 | 5/1987 | Takefuta et al. | 192/0.084 X |
| 4,753,618 | 6/1988 | Entringer | 74/851 X |
| 4,817,466 | 4/1989 | Kawamura et al. | 440/75 X |
| 4,843,914 | 7/1989 | Koike | 477/109 |
| 4,861,295 | 8/1989 | McElroy, Jr. et al. | 440/75 X |
| 5,072,629 | 12/1991 | Hirukawa et al. | 74/851 |
| 5,079,969 | 1/1992 | Kato et al. | 477/109 |
| 5,171,176 | 12/1992 | Gebhardt et al. | 192/0.084 X |
| 5,184,301 | 2/1993 | Stasell | 192/0.084 X |

FOREIGN PATENT DOCUMENTS

| 2-67444 | 7/1990 | Japan . |
| 404012141 | 1/1992 | Japan | 477/101 |

*Primary Examiner*—Dirk Wright
*Assistant Examiner*—Khoi Q. Ta
*Attorney, Agent, or Firm*—Sughrue, Mion, Zinn, Macpeak & Seas

[57] ABSTRACT

A control device for an internal combustion engine comprises a shift lever position detector for detecting a shift lever position of an engine for an outboard motor; and an ignition timing controller for retarding an ignition timing of the engine for the outboard motor based on the shift lever position when a clutch is disengaged.

15 Claims, 10 Drawing Sheets

CONTROL DEVICE FOR AN INTERNAL COMBUSTION ENGINE

This is a continuation of application Ser. No. 07/870,347, filed Apr. 17, 1992, abandoned.

BACKGROUND OF THE INVENTION

1. Field of the Invention

The present invention relates to a control device for an internal combustion engine for an outboard motor.

2. Discussion of Background

Figure 8:
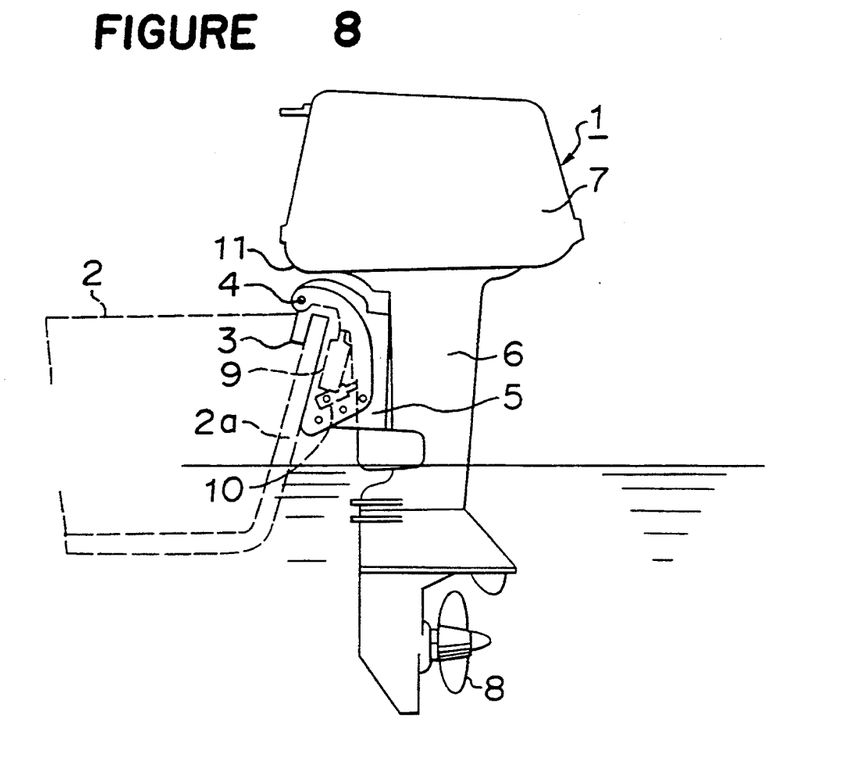
FIG. 8 is a side view showing a total of an outboard motor mounted with a conventional control device for an internal combustion engine.

Explanation will be given to a conventional example referring to FIGS. 8 and 9. FIG. 8 is a side view showing a total of an outboard motor mounted with a conventional control device for an internal combustion engine.

In FIG. 8, an outboard motor 1 is attached to a stern plate 2a of a boat 2 through a clamp bracket 3. A swivel bracket 5 is rotatably attached to the clamp bracket 3 around a tilting shaft 4, and a drive unit 6 of the outboard motor 1 is connected to the swivel bracket 5. An engine unit 7 is attached to the upper side of the drive unit 6, and a propeller 8 is attached to the lower side thereof.

The swivel bracket 5 is tilted up or tilted down by a tilting cylinder 9. The swivel bracket 5 is controlled to trim by two trimming cylinders 10. A steering bracket 11 rotates the drive unit 6 with respect to the swivel bracket 5 around a steering shaft, not shown, thereby performing the steering.

The tilting cylinder 9 and the trimming cylinders 10 are expanded and retracted by hydraulic pressure from a hydraulic pump driven by an electric motor, not shown, thereby performing the tilting-up or the tilting-down, and a trim angle control. The trim angle control is performed by controlling a rotational direction and a rotational speed of an electric motor. The direction of thrust of the propeller 8 is controlled by the trim angle control in accordance with an inclination and a speed of the boat, thereby obtaining optimum speed, fuel cost and acceleration.

Figure 9:
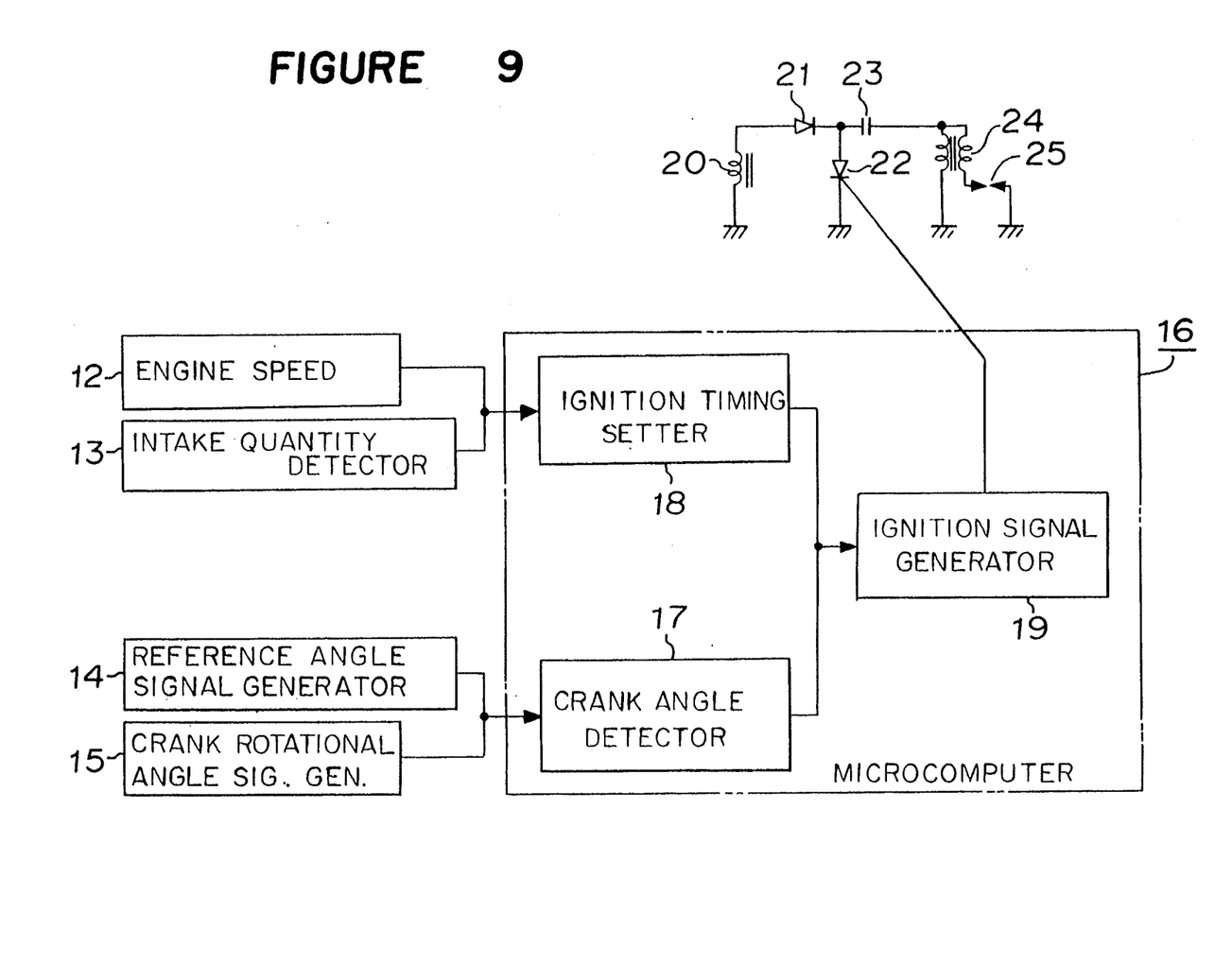
FIG. 9 is a block diagram showing a first conventional control device for an internal combustion engine.

FIG. 9 is a block diagram showing a first conventional control device for an internal combustion engine. In FIG. 9, a reference numeral 12 designates an engine speed detector, 13, an intake quantity detector, 14, a reference angle signal generator, 15, a crank rotational angle signal generator, 16, a microcomputer, 17, a crank angle detector, 18, an ignition timing setter, 19, an ignition signal generator, 20, an electricity generating coil, 21, a diode, 22, an SCR (semiconductor-controlled rectifier), 23, an ignition condenser, 24, an ignition coil and 25, an ignition plug. The crank angle detector 17, the ignition time setter 18 and the ignition signal generator 19 are composed of softwares.

A pulser coil, not shown, is fixed to an engine main body in the engine unit 7. Each of a plurality of permanent magnets provided around a crankshaft opposes the pulser coil once per one rotation of the crankshaft. Accordingly, one pulse of an electric pulse is induced to the pulser coil with respect to each cylinder at every one rotation of the crankshaft.

A ring gear is fixed around a peripheral portion of a rotor, which receives rotational force by a starter at starting-up of the engine. The crank rotational angle signal generator 15 is opposingly provided at the peripheral portion of the ring gear, which is fixably provided to the engine main body. Electric pulses are induced in the crank rotational angle signal generator 15, with a rotation of the crankshaft, which correspond with respective teeth of the ring gear.

Accordingly, the pulser coil 17 generates the pulses with respect to number of cylinders respectively corresponding to fixed angular positions of the crankshaft, in one rotation of the crankshaft, that is, reference angle signals of the crankshaft. Therefore, the pulser coil functions as the reference angle signal generator 14 of the crankshaft. The angular position of the crankshaft can be detected by counting the generated pulse numbers of the crankshaft rotational angle signal generator 15 after the time point of generating the pulses by the pulser coil.

Furthermore, the pulser coil functions as the engine speed detector 12. Since the pulser coil generates the pulses for the number of the cylinders at every rotation of the crankshaft, the rotational speed of the crankshaft, that is, the engine speed can be detected by measuring a period between the generated pulses of the pulser coil.

A throttle opening degree detector composed of a potentiometer as the intake quantity detector 13, generates a voltage in accordance with a rotational angle of a throttle valve which rotates in response to an operational quantity of a throttle wire, and is capable of detecting an opening degree of the throttle valve, that is, an intake quantity to each cylinder.

The microcomputer 16 is fixed to the engine main body, and as shown in FIG. 9, controls the SCR 22 of an CDI (condenser discharge ignition) ignition device by the crank angle detector 17, the ignition timing setter 18 and the ignition signal generator 19.

The crank angle detector 17 detects the angular position of the crankshaft, by counting the generated pulse number of the crank rotational angle signal generator 15 after the time point of the pulse generation by the pulser coil as the reference angle signal generator 14, as mentioned above.

The ignition timing setter 18 is capable of obtaining an optimum ignition timing, since the ignition timing is a function of the engine speed and a mixture ratio of an intake mixture.

The ignition signal generator 19 generates an ignition signal at a time point wherein the crank angle position is situated at the optimum ignition timing, based on the detection results of the crank angle detector 17 and the ignition time setter 18, switches a gate of the SCR 22 which corresponds to the respective cylinders in a conductive state, and generates electric discharge at the ignition plugs 25 of the respective cylinders. Accordingly, by determining a predetermined ignition timing for the ignition time setter 18 by an advance angle control of the microcomputer 16, the ignition can be performed at the optimum ignition timing which does not cause an abnormal combustion in various running conditions of the engine.

In the CDI ignition device, a voltage generated at the electricity generating coil 20 of a magnet is rectified by the diode 21 and begins to charge the ignition condenser 23, and thereafter, the gate of the SCR 22 is in the conductive state by a signal current generated by the ignition signal generator 19. At the same time, by applying abruptly an electric charge accumulated in the ignition condenser 23 to a primary side of the ignition coil 24, a high-tension voltage is generated at a secondary side of the ignition coil 24, thereby enabling the ignition plug 25 to generate the electric discharge.

Figure 10:
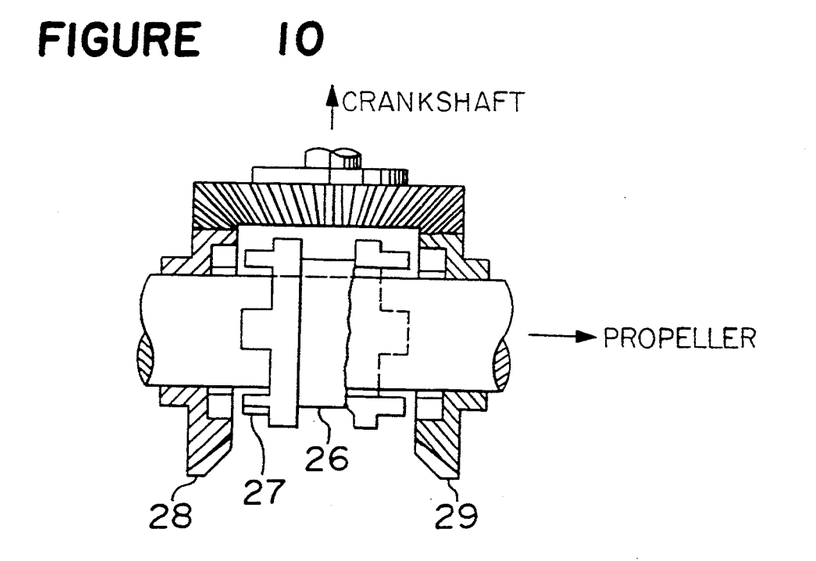
FIG. 10 is a diagram showing a dog clutch of a conventional control device for an internal combustion engine.

In the engine for the outboard motor, a torque of the engine is transmitted to the propeller 8 through the crankshaft and a clutch. Generally, as the clutch of the engine for the outboard motor, a dog clutch 26 shown in FIG. 10 is utilized, of which engaging and disengaging is performed by a shift lever. The dog clutch 26 is moved by moving the shift lever, and a clutch claw 27 engages with a forward gear 28 or a reverse gear 29, thereby transmitting the torque of the crankshaft to the propeller 8. Furthermore, the shift lever is composed as incorporating an accelerator. In case that the shift lever position is at a central position, the clutch is connected to a neutral position. In case that the shift lever position is shifted forward (reverse), the clutch is connected to the forward gear (reverse gear). An accelerator opening degree is increased by moving the clutch to the forward (reverse) direction.

Figure 11:
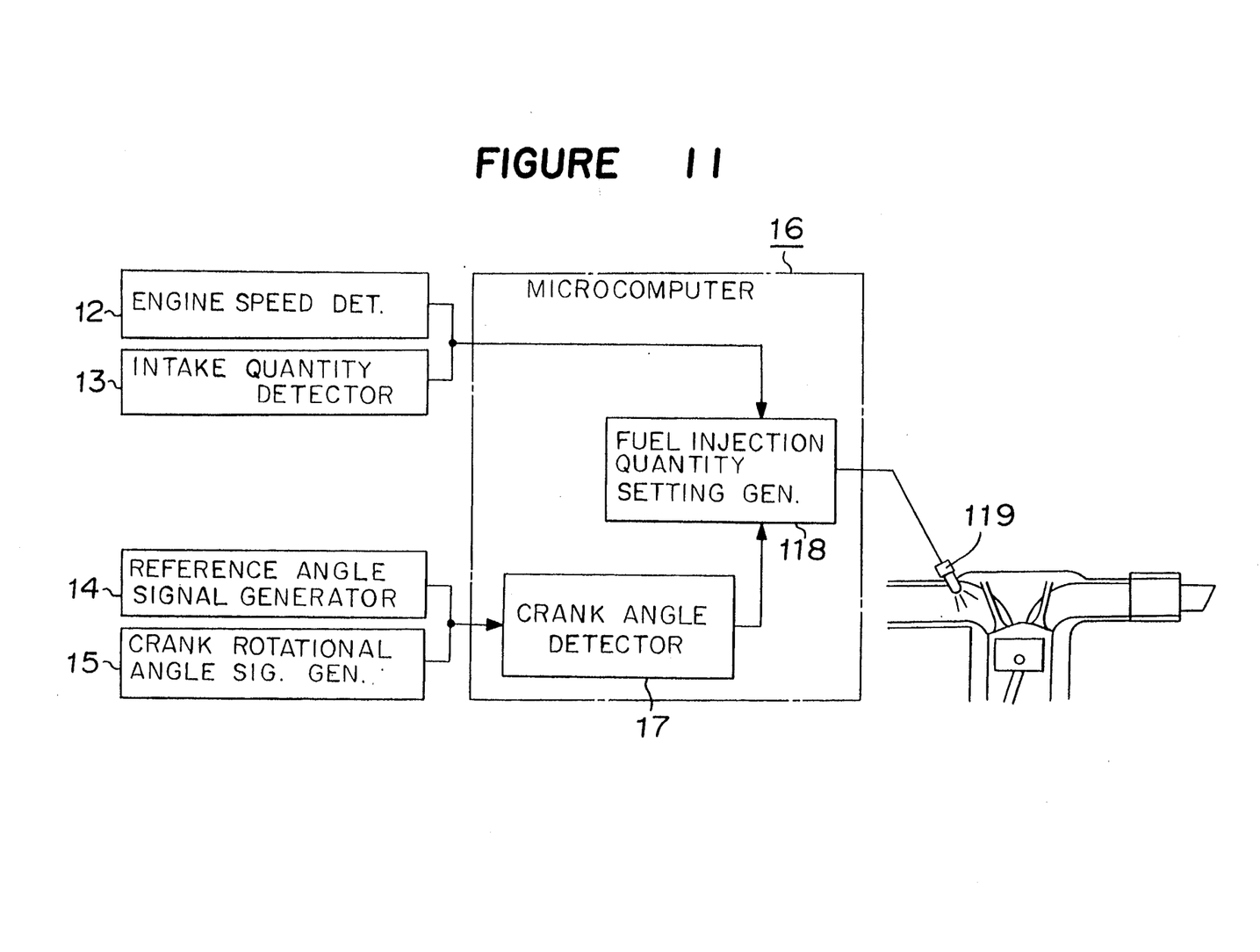
FIG. 11 is a block diagram showing a second conventional control device for an internal combustion engine.

FIG. 11 is a block diagram showing a second conventional control device for an internal combustion engine. In FIG. 11, a reference numeral 12 designates the engine speed detector, 13, the intake quantity detector, 14, the reference angle signal generator, 15, the crank angle signal generator, 16, the microcomputer, 17, the crank angle detector, 118, a fuel injection quantity setting generator and 119, an injector. The crankshaft angle detector 17 and the fuel injection quantity setting generator 118 are composed of softwares.

The microcomputer 16 is fixed to the engine main body, and as shown in FIG. 11, controls the injector 119 based on the crank angle detector 17 and the fuel injection quantity setting generator 118.

Furthermore, the fuel injection quantity setting generator 118 controls a fuel injection quantity of the injector 119 based on the engine speed, the intake quantity and the crank angle. That is, the fuel injection quantity setting generator 118 controls the fuel injection quantity by a pulse width of a pulse signal from the fuel injection quantity setting generator 118 to the injector 119.

In the above conventional control devices for an internal combustion engine, when the clutch is shifted from the forward position or from the reverse position to the neutral position and when the torque of the engine is large, the torque in the peripheral direction is large, since a dog clutch claw 27 is engaged with the forward gear 28 or the reverse gear 29 and a torque in the axial direction is required which is larger than that of the torque in the peripheral direction to disengage the dog clutch 26 from the respective gear.

Furthermore, in the above conventional control devices for an internal combustion engine, the accelerator opening degree is inevitably in a fully-closed state, when the clutch is connected to the forward gear (reverse gear) by shifting it from the neutral position. Accordingly, the connection of the clutch is performed in a state wherein the torque of the engine is small, thereby causing an engine stoppage in case that the increase of an engine load initiated by the clutch connection is excessively large.

SUMMARY OF THE INVENTION

It is an object of the present invention to solve above problems. It is an object of the present invention to obtain a control device for an internal combustion engine capable of promoting operability of the shift lever by reducing the torque of the engine when the clutch is disengaged.

Furthermore, it is an object of the present invention to obtain a control device for an internal combustion engine capable of preventing the engine stoppage by the increase of the torque of the engine when the clutch is engaged.

According to the first aspect of the present invention, there is provided a control device for an internal combustion engine comprising:

a shift lever position detecting means for detecting a shift lever position of an engine for an outboard motor; and an ignition timing controlling means for retarding an ignition timing of the engine for the outboard motor based on the shift lever position when a clutch is disengaged.

According to the second aspect of the present invention, there is provided a control device for an internal combustion engine comprising:

a shift lever position detecting means for detecting a shift lever position of an engine for an outboard motor; and an ignition timing controlling means for advancing an ignition timing of the engine for the outboard motor based on the shift lever position when a clutch is engaged.

According to the third aspect of the present invention, there is provided a control device for an internal combustion engine comprising:

a shift lever position detecting means for detecting a shift lever position of an engine for an outboard motor; and a fuel injection quantity controlling means for controlling a fuel injection quantity of the engine for the outboard motor based on the shift lever position.

DETAILED DESCRIPTION OF THE PREFERRED EMBODIMENTS

EXAMPLE 1

Figure 1:
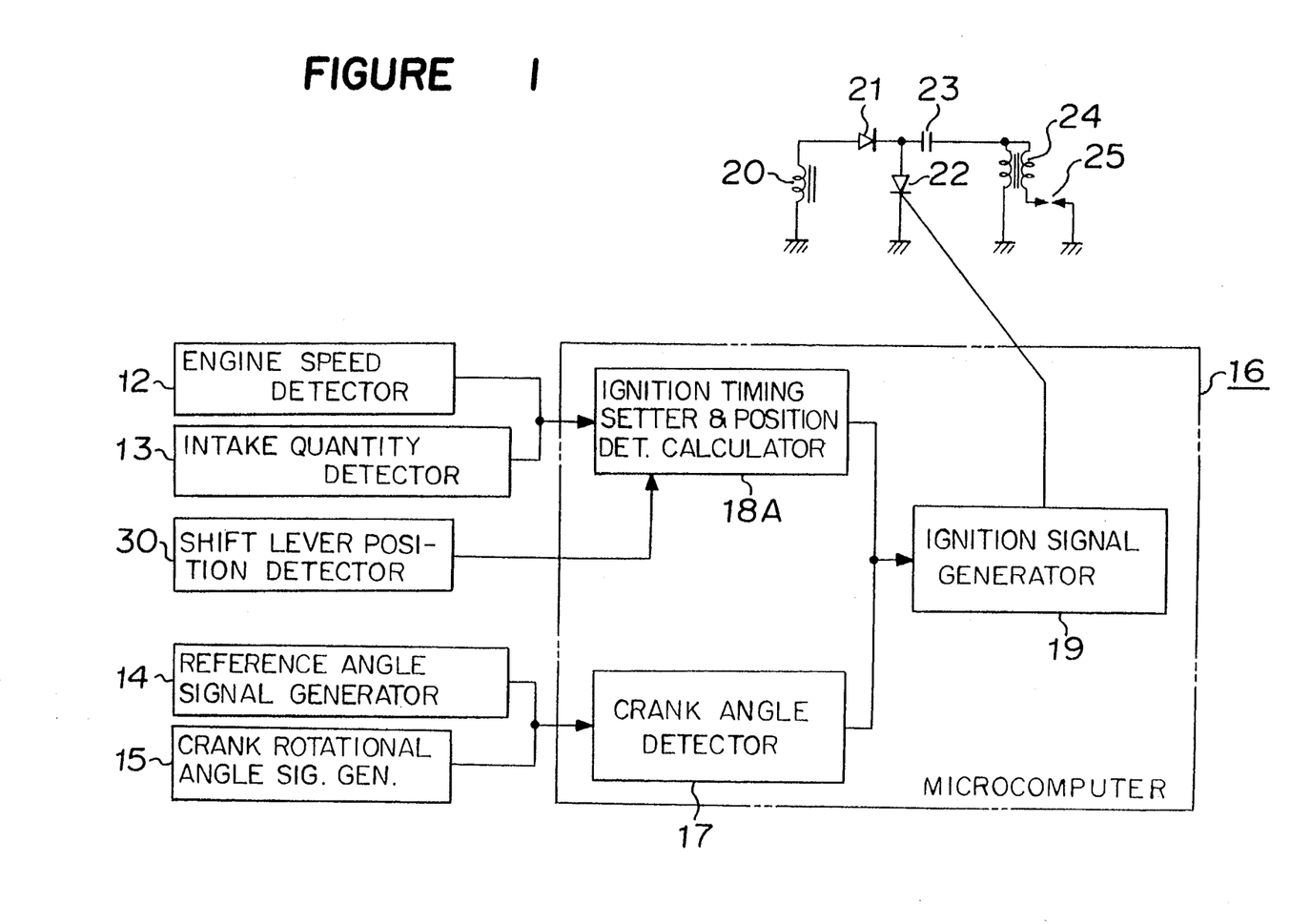
FIG. 1 is a block diagram showing a first embodiment of the present invention.

Explanation will be given to construction of a first embodiment of the present invention referring to FIGS. 1, 2, 3A and 3B. FIG. 1 is a block diagram showing the first embodiment of the present invention, wherein other than an ignition time setter and position detector calculator 18A and a shift lever position detector 30, the parts such as the engine speed detector 12 through the crank angle detector 17, the ignition signal generator 19, and the CDI ignition device (from the electricity generating coil 20 through the ignition plug 25) are the same with those in the first conventional device. The ignition timing setter 18A is composed of a software in this example.

Figure 2:
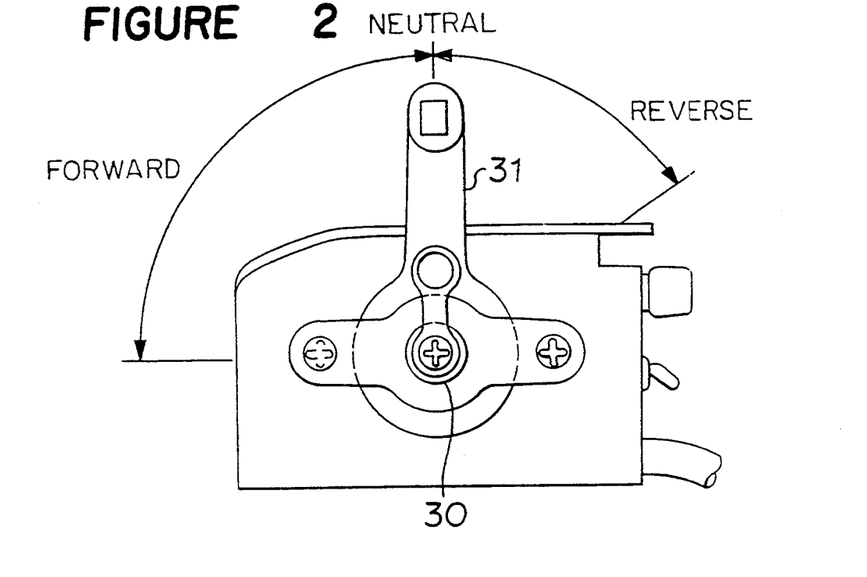
FIG. 2 is a front view showing a shift lever control box provided with a shift lever position detector of the first embodiment of the present invention.
Figure 3A:
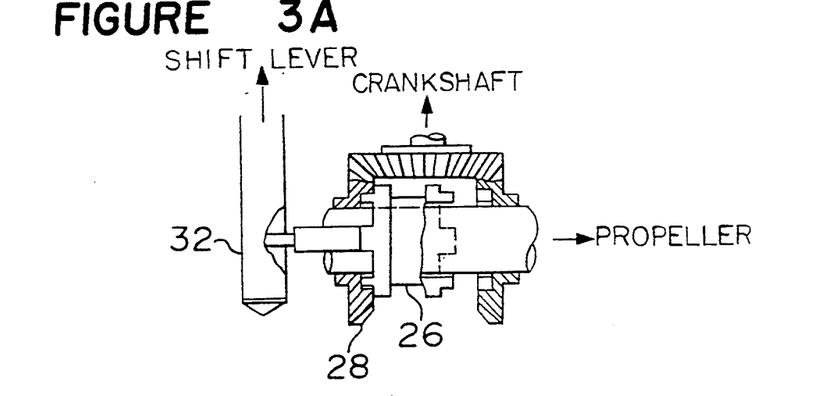
FIGS. 3A and 3B are diagrams showing operation of a clutch in the first embodiment of the present invention.
Figure 3B:
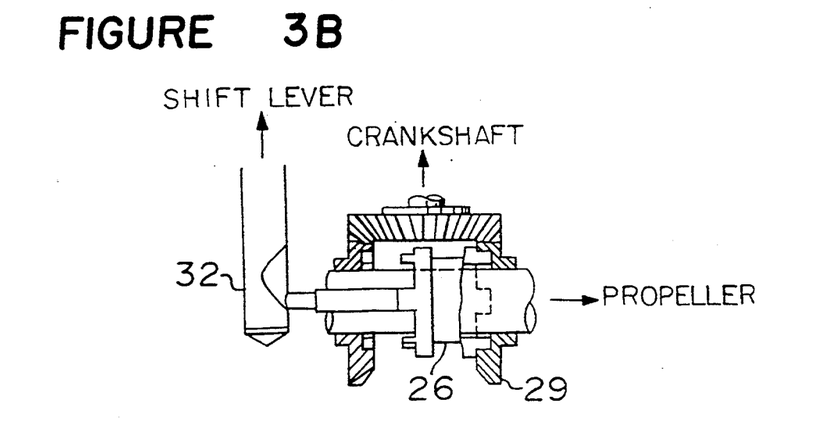

FIG. 2 is a front view showing a shift lever control box provided with a shift lever position detector of the first embodiment of the present invention, and FIGS. 3A and 3B are diagrams showing operation of a clutch in the first embodiment of the present invention. When a shift lever 31 is shifted from a neutral position to forward side (left-hand side in FIG. 2), as shown in FIG. 3A, the dog clutch 26 engages with a forward gear 28 by a rod 32 through a wire, not shown. Furthermore, when it is shifted from the neutral position to a reverse side, as shown in FIG. 3B, the dog clutch 26 engages with a reverse gear 29 by the rod 32. A shift lever position detector 30 is, for instance, composed of a potentiometer or a normal switch, which converts motion of the shift lever 31 into an electric signal.

The shift lever position detecting means of the present invention is composed of the shift lever position detector 30 in the first embodiment of the present invention, and the ignition timing controlling means of the present invention is composed of the crank angle detector 17, the ignition timing setter and position detector calculator 18A and the ignition signal generator 19, in the first embodiment.

Figure 4:
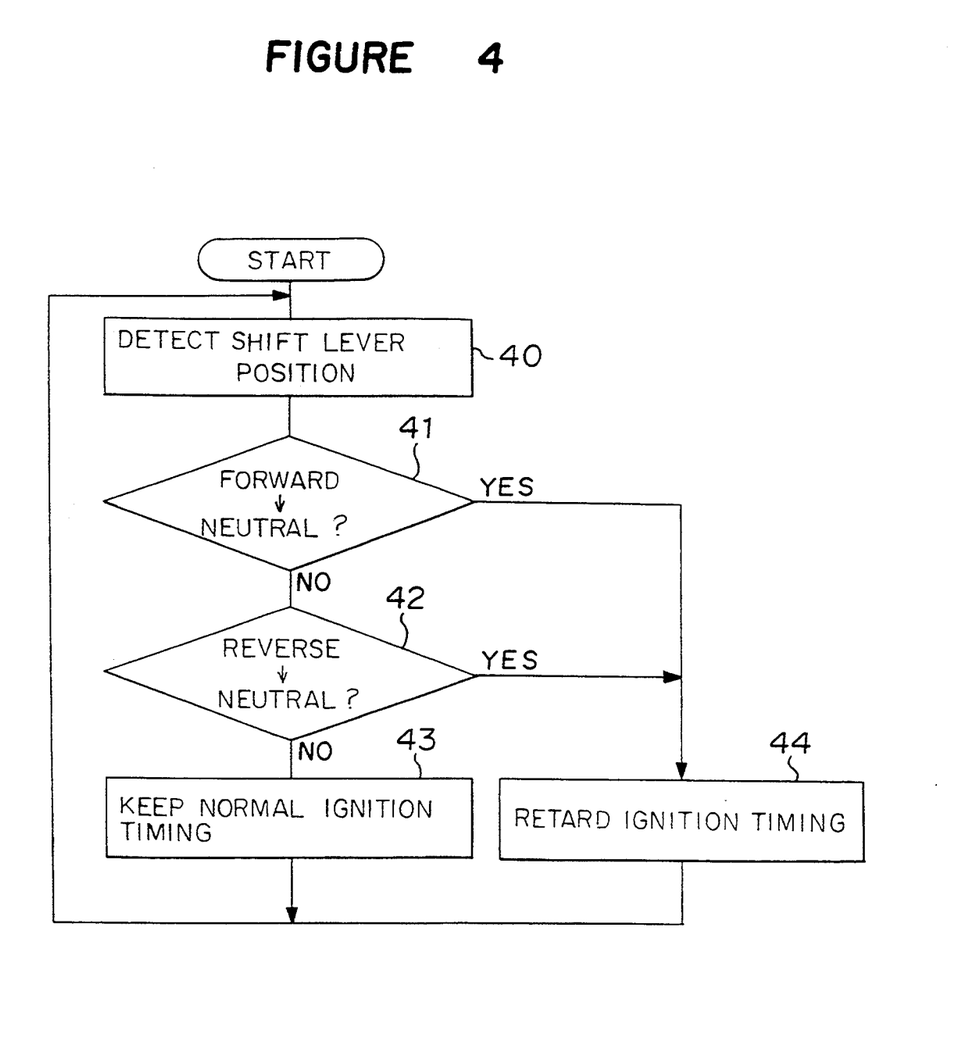
FIG. 4 is a flowchart showing operation of an ignition timing setter of the first embodiment according to the present invention.

Next, explanation will be given to the operation of the first embodiment referring to FIG. 4. FIG. 4 is a flowchart showing the operation of the ignition time setter and position detector calculator 18A of the first embodiment according to the present invention.

The ignition timing setter 18A in the microcomputer 16 obtains the ignition timing based on the engine speed and the intake quantity as in the conventional Example. The ignition timing setter and position detector calculator 18A retards the ignition timing based on the detected position of the shift lever 31 by the following steps, and the ignition signal generator 19 inputs the ignition signal to the SCR 22 in response with the retarded ignition timing.

In step 40 of FIG. 4, the ignition timing setter 18A detects the position of the shift lever 31 by an output of the shift lever position detector 30.

In step 41, in case that the position of the shift lever 31 is out of a range of a predetermined distance from the neutral position and is moving in the direction from the forward position to the neutral position (NO), the operation proceeds to the next step 42. When the position of the shift lever 31 is in the range of the predetermined distance from the neutral position (YES), the operation proceeds to step 44.

In step 42, in case that the position of the shift lever 31 is out of a range of a predetermined distance from the neutral position and is moving in the direction from the reverse position to the neutral position (NO), the operation proceeds to the next step 43. When it is in the range of the predetermined distance from the neutral position (YES), the operation proceeds to step 44.

In step 43, the operation inputs the ignition timing "A" degree (an angle from TDC of the crankshaft towards BTDC) which is obtained based on the engine speed and the intake quantity, to the ignition signal generator 19, and goes back to step 40. TDC is an abbreviation of top dead center.

In step 44, the operation inputs the ignition timing (A-a) degree to the ignition signal generator 19, wherein the ignition timing is retarded by "a" degree for a predetermined period "T" corresponding with a size of the engine etc. until the position of the shift lever 31 is shifted to the neutral position, and goes back to step 40.

In the first embodiment of the present invention, as stated above, the shift lever position detector 30 which is capable of detecting the position of the shift lever 31, and the ignition timing setter and position detector calculator 18A which is capable of changing the ignition timing of the engine for the outboard motor in accordance with the position of the shift lever 31 detected by the shift lever position detector 30, are provided. Accordingly, the disengagement of the clutch is easily operated by the operation of the shift lever 31 wherein the torque of the engine is reduced by controlling the ignition timing to a retarded state compared with a normal condition, when the disengaging operation of the clutch is performed, thereby producing an effect wherein the operability and the stability of the engine for the outboard motor are improved.

In the above explanation, a case has been mentioned wherein this invention is utilized in a four cycle engine. However, naturally it can be utilized in the other engine, for instance, a two cycle engine.

EXAMPLE 2

Figure 5:
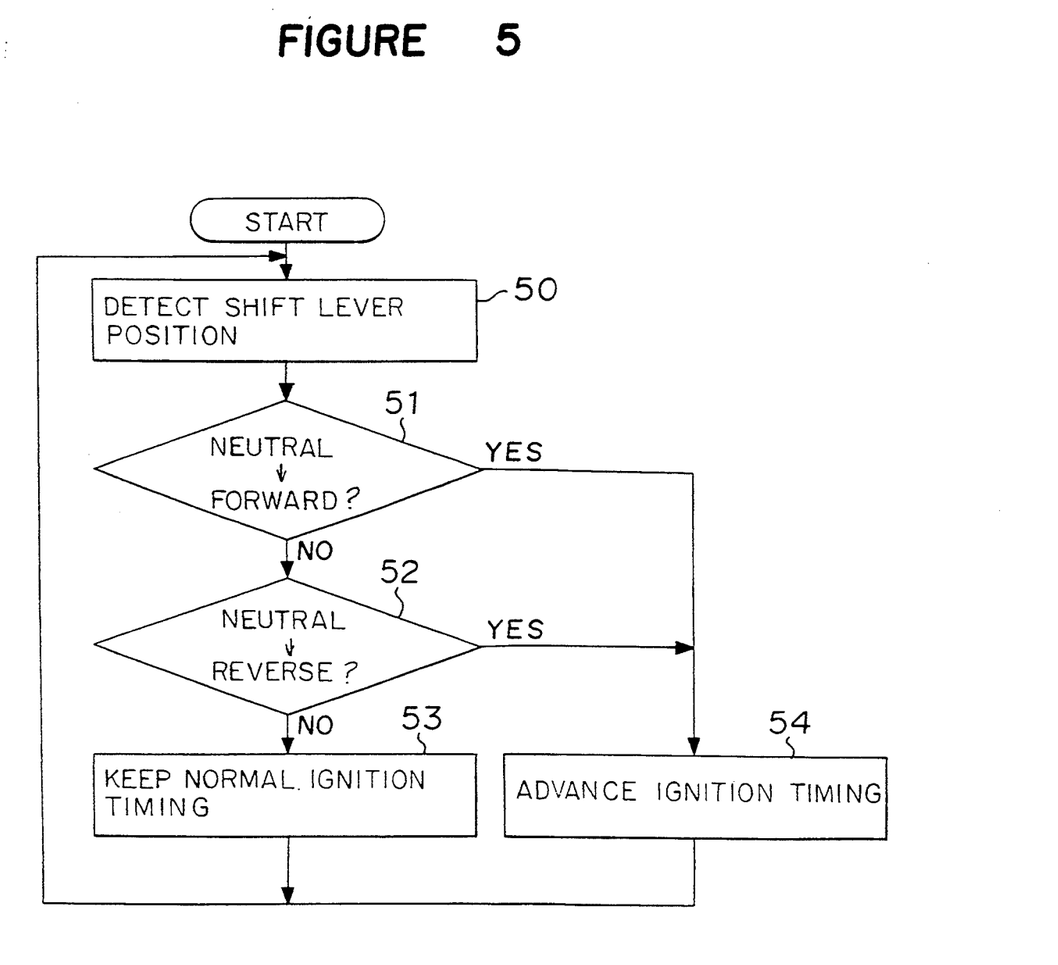
FIG. 5 is a flowchart showing operation of an ignition time setter of a second embodiment of the present invention.

Next, explanation will be given to operation of a second embodiment referring to FIG. 5. FIG. 5 is a flowchart showing operation of the ignition timing setter and position detector calculator 18A in the second embodiment of the present invention.

The ignition timing setter and position detector calculator 18A in the microcomputer 16 determines the ignition timing based on the engine speed and the intake quantity, as in the conventional example. The ignition timing setter and position detector calculator 18A advances the ignition timing based on the detected position of the shift lever as in the following steps. The ignition signal generator 19 inputs the ignition signal which corresponds with the advanced ignition timing, to the SCR 22.

In step 50 of FIG. 5, the ignition timing setter 18A detects the position of the shift lever 31 by an output of the shift lever position detector 30.

In step 51, in case that the position of the shift lever 31 is out of a range of a predetermined distance from the neutral position and is moving in the direction from the neutral position to the forward position (NO), the operation proceeds to the next step 52. When it is in the range of the predetermined range from the neutral position (YES), the operation proceeds to step 54.

In step 52, in case that the position of the shift lever 31 is out of a range of a predetermined distance from the neutral position and is moving in the direction from the neutral position to the reverse position, the operation proceeds to next step 53. When it is in the range of the predetermined distance from the neutral position (YES), the operation proceeds to step 54.

In step 53, the operation inputs the ignition timing "A" degree (an angle from TDC of the crankshaft towards BTDC) to the ignition signal generator 19, which is obtained based on the engine speed and the intake quantity, and goes back to step 50.

In step 54, the operation inputs the ignition timing (A+a) degree to the ignition signal generator 19, which is advanced by "a" degree for a predetermined time period "T" in correspondence with a size of the engine etc. until the position of the shift lever 31 reaches a predetermined distance in the forward position or the reverse position, and goes back to step 50.

In the second embodiment of the present invention, as stated above, the shift lever position detector which is capable of detecting the position of the shift lever 31, and the ignition timing setter and position detector calculator 18A which is capable of changing the ignition timing of the engine for the outboard motor in accordance with the position of the shift lever 31 detected by the shift lever position detector 30, are provided. Accordingly, the ignition timing setter 18A can detect the connection state of the clutch, and controls to advance the ignition timing compared with a normal state, for a predetermined time, when the torque is needed in response with an increase of an engine load initiated by the connection operation. Therefore, the torque of the engine is increased and the engine stoppage can be prevented. Accordingly, this invention has an effect wherein the operability and stability of the engine for the outboard engine can be improved.

In the above explanation, a case is shown wherein this invention is utilized in a four cycle engine. However, naturally it can be utilized in the other engines, for instance, a two cycle engine.

EXAMPLE 3

Figure 6:
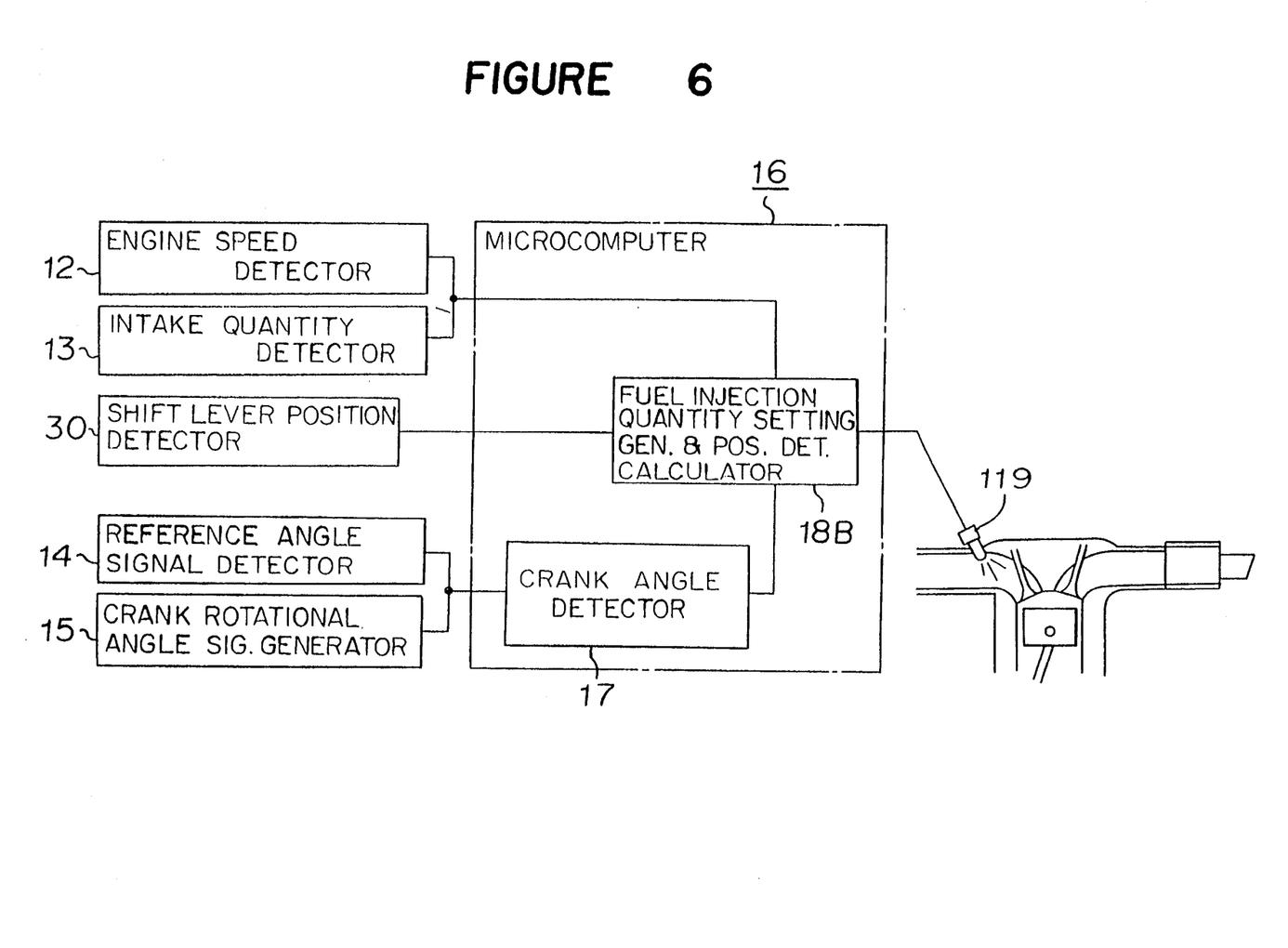
FIG. 6 is a block diagram showing a third embodiment of the present invention.

Explanation will be given to construction of a third embodiment of the present invention referring to FIG. 6. FIG. 6 is a block diagram showing the third embodiment of the present invention, wherein other than a fuel injection quantity setting generator and position detector calculator 18B and a shift lever position detector 30, the parts such as the engine speed detector 12 through the crank angle detector 17, and the injector 119 are the same with those in the second conventional device. The fuel injection quantity setting generator and position detector calculator 18B is composed of a software in this example.

Figure 7A:
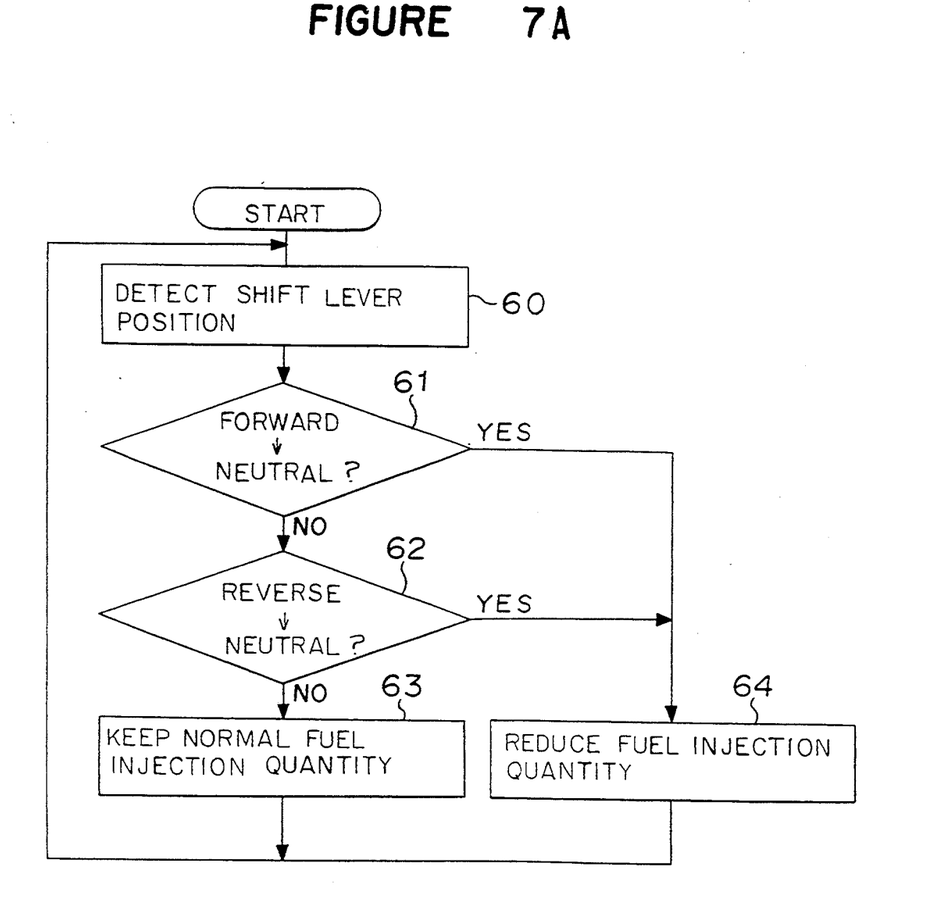
FIGS. 7A and 7B are flowcharts showing operation of a fuel injection quantity setting generator of third and fourth embodiments of the present invention.

Next, explanation will be given to the operation of the third embodiment referring to FIG. 7A. FIG. 7A is a flowchart showing the operation of the fuel injection quantity setting generator 18B of the third embodiment of the present invention.

The fuel injection quantity setting generator 18B in the microcomputer 16 obtains the fuel injection quantity based on the engine speed, the intake quantity and the crank angle, as in the conventional example. The fuel injection quantity setting generator and position detector calculator 18B reduces the fuel injection quantity based on the detected position of the shift lever 31, and inputs a pulse signal having a pulse width in accordance with the reduced fuel injection quantity, to the injector 119 by the following steps.

In step 60 of FIG. 7A, the fuel injection quantity setting generator and position detector calculator 18B detects the position of the shift lever 31 from an output of the shift lever position detector 30.

In step 61, in case that the position of the shift lever 31 is out of a range of a predetermined distance from the neutral position and is moving in the direction from the forward position to the neutral position (NO), the operation proceeds to step 62. When it is in the range of the predetermined distance from the neutral position (YES), the operation proceeds to step 64.

In step 62, when the position of the shift lever 31 is out of the range of a predetermined distance of the neutral position and is moving in the direction of the reverse position to the neutral position (NO), the operation proceeds to step 63. When it is in the range of the predetermined distance from the neutral position (YES), the operation proceeds to step 64.

In step 63, the operation supplies the fuel injection quantity based on the engine speed, the intake quantity and the crank angle, to the injector 119, and goes back to step 60.

In step 64, the operation reduces the fuel injection quantity in accordance with a size of the engine until the position of the shift lever 31 reaches the neutral position, and inputs a pulse signal having a pulse width in accordance with the reduced fuel injection quantity, to the injector 19, and goes back to step 40.

In the third embodiment of the present invention, as stated above, the shift lever position detector 30 which is capable of detecting the position of the shift lever 31, and the fuel injection quantity setting generator 18B which is capable of changing the fuel injection quantity of the engine for the outboard motor in accordance with the position of the shift lever which is detected by the shift lever position detector 30, are provided. Accordingly, the disengagement of the clutch can easily be performed by the operation of the shift lever 31 wherein the torque of the engine is reduced by controlling the fuel injection quantity to be reduced compared with a normal state in the disengaging operation of the clutch. Therefore, this invention has an effect wherein the operability and the stability of the engine for the outboard motor can be improved.

Figure 7B:
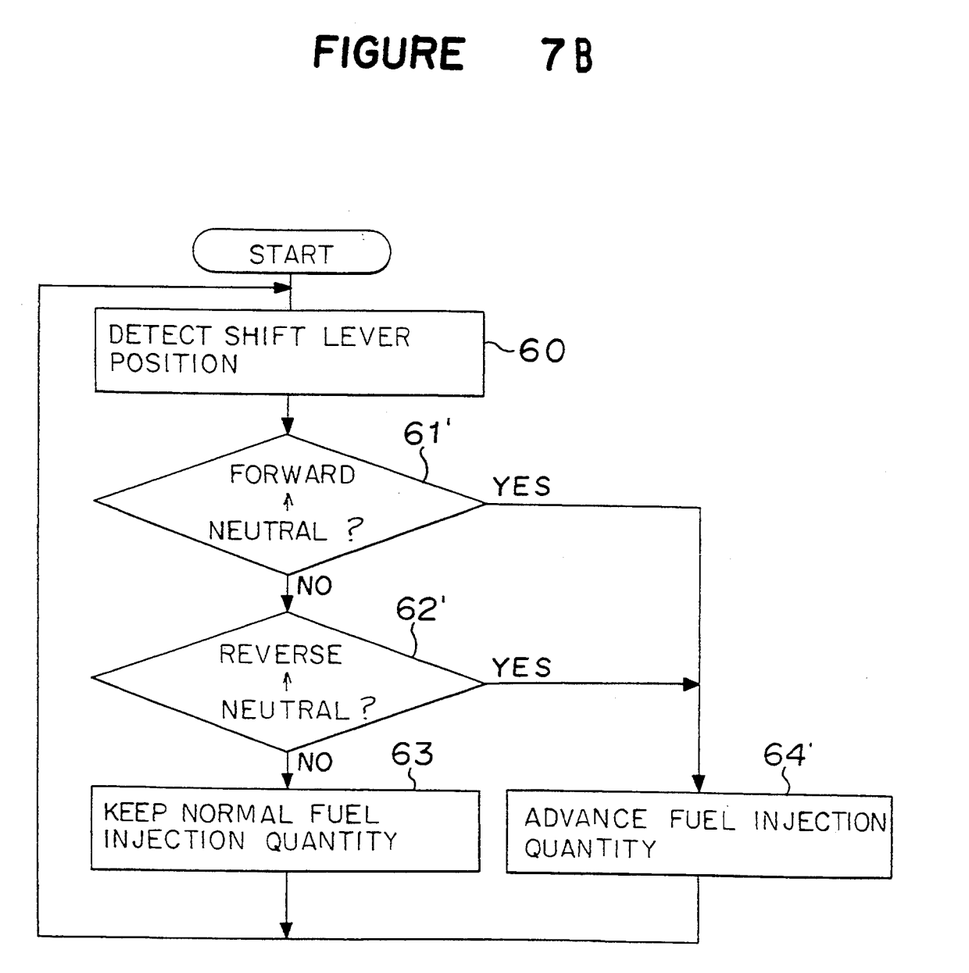

Furthermore, it is possible to prevent an engine stoppage by increasing the torque of the engine, wherein the fuel injection quantity is increased, when the clutch is engaged by the operation of the shift lever 31, as shown in FIG. 7B.

In the above explanation, a case is mentioned wherein this invention is utilized in a four cycle engine. However, naturally, this invention can be utilized in the other engines, for instance, a two cycle engine.

As explained above, since this invention provides the shift lever position detecting means for detecting the position of the shift lever of the engine for the outboard motor and the ignition timing control means for retarding the ignition timing of the engine for the outboard motor in case of the clutch disengagement based on the position of the shift lever, this invention has an effect capable of promoting the operability of the shift lever by reducing the torque of the engine in case of disengaging the clutch.

Furthermore, as explained above, since this invention provides the shift lever position detecting means for detecting the position of the shift lever of the engine for the outboard motor, and the ignition timing control means for advancing the ignition timing of the engine for the outboard motor in case of the clutch engagement based on the position of the shift lever, this invention has an effect capable of preventing the engine stoppage by enhancing the torque of the engine in case of engaging the clutch.

Furthermore, as explained above, since this invention provides the shift lever position detecting means for detecting the position of the shift lever of the engine for the outboard motor and the fuel injection quantity control means for controlling the fuel injection quantity to the engine for the outboard motor based on the position of the shift lever, this invention has an effect capable of promoting the operability of the shift lever by reducing the torque of the engine in case of disengaging the clutch.

What is claimed is:

1. A control device adaptable for controlling an internal combustion engine comprising:
   shift lever position detector for detecting a position of a shift lever coupled to a dog clutch; and
   ignition timing controller for determining a distance between the shift lever and a shift lever neutral position and a direction of movement of the shift lever, based on a detected shift lever position, and for retarding an ignition timing of the internal combustion engine when said direction indicates movement from an engaged to a disengaged position is said dog clutch and when said distance is determined to be in a predetermined range.

2. A control device adaptable for controlling an internal combustion engine according to claim 1, wherein said shift lever is operatively coupled to said dog clutch, said dog clutch being associated with an outboard motor.

3. A control device adaptable for controlling an internal combustion engine according to claim 1, wherein said ignition timing controller retards said ignition timing below a predetermined ignition timing position and advances said ignition timing above said predetermined ignition timing position based on a relative position between the shift lever and said shift lever neutral position and said direction of movement.

4. A control device adaptable for controlling an internal combustion engine according to claim 1, wherein the ignition timing controller retards the ignition timing when said controller determines that movement of the shift lever corresponds to movement of said dog clutch toward a disengagement position.

5. A control device adaptable for controlling an internal combustion engine comprising:
   shift lever position detector for detecting a position of a shift lever coupled to a dog clutch; and
   ignition timing controller for increasing an said engine torque of said internal combustion engine above a predetermined torque by advancing an ignition timing of the internal combustion engine above a predetermined ignition timing position based on the shift lever position when said controller determines that the shift lever is moving said dog clutch toward an engagement position.

6. A control device adaptable for controlling an internal combustion engine according to claim 5, wherein said shift lever is operatively coupled to said dog clutch, said dog clutch being associated with an outboard motor.

7. A control device adaptable for controlling an internal combustion engine according to claim 5, wherein said ignition timing controller retards said ignition timing below said predetermined ignition timing position, based on the shift lever position, when movement of the shift lever corresponds to movement of said dog clutch toward a disengagement position.

8. A control device adaptable for controlling an internal combustion engine according to claim 5, wherein said ignition timing controller further includes means for determining a distance between the shift lever and a shift lever neutral position and means for determining whether said distance is within a predetermined range, said ignition timing controller advancing said ignition timing when said distance within said predetermined range.

9. A control device adaptable for controlling an internal combustion engine according to claim 5, wherein the ignition timing controller further includes means for determining a direction of movement of the shift lever, based on a detected shift lever position.

10. A control device adaptable for controlling an internal combustion engine comprising:
    shift lever position detector for detecting a position of a shift lever coupled to a dog clutch; and
    fuel injection quantity controller including means for determining a direction of movement of the shift lever and for controlling a fuel injection quantity of the internal combustion engine based on the shift lever position and direction of movement.

11. A control device adaptable for controlling an internal combustion engine according to claim 10, wherein said shift lever is operatively coupled to said dog clutch, said dog clutch being an integral part of an outboard motor.

12. A control device according to claim 10, wherein said fuel injection quantity controller further includes means for determining a distance between said shift lever and a shift lever neutral position and for controlling said fuel injection quantity based on whether said shift lever is within a predetermined range from said shift lever neutral position.

13. A control device adaptable for controlling an internal combustion engine according to claim 10, wherein said fuel injection quantity controller further includes:
    means for determining when said shift lever is within a predetermined distance from a shift lever neutral position; and
    means for reducing said fuel injection quantity when said shift lever is within said predetermined distance and when movement of said shift lever corresponds to movement of said dog clutch toward a disengagement position.

14. A control device adaptable for controlling an internal combustion engine according to claim 10, wherein said fuel injection quantity controller further includes:
    means for determining a distance between the shift lever and a shift lever neutral position; and
    means for increasing the fuel injection quantity when said shift lever is within said predetermined distance from the shift lever neutral position and when movement of the shift lever corresponds to movement of said dog clutch toward an engagement position.

15. A control device adaptable for controlling an internal combustion engine according to claim 10, wherein said fuel injection quantity controller increases an engine torque of said internal combustion engine above a predetermined engine torque by increasing a fuel injection quantity of the internal combustion engine when movement of the shift lever corresponds to movement of said dog clutch toward an engagement position.

* * * * *